United States Patent
Kwon et al.

(10) Patent No.: US 11,670,848 B2
(45) Date of Patent: Jun. 6, 2023

(54) ANTI-JAMMING SYSTEM

(71) Applicant: Wichita State University, Wichita, KS (US)

(72) Inventors: Hyuck M. Kwon, Wichita, KS (US); Krittetash Pinoyoanuntapong, Wichita, KS (US); Khanh Pham, Albuquerque, NM (US)

(73) Assignee: WICHITA STATE UNIVERSITY, Wichita, KS (US)

( * ) Notice: Subject to any disclaimer, the term of this patent is extended or adjusted under 35 U.S.C. 154(b) by 248 days.

(21) Appl. No.: 17/002,452

(22) Filed: Aug. 25, 2020

(65) Prior Publication Data

US 2021/0075100 A1 Mar. 11, 2021

Related U.S. Application Data

(60) Provisional application No. 62/891,764, filed on Aug. 26, 2019.

(51) Int. Cl.
| | | |
|---|---|---|
| *H01Q 3/26* | (2006.01) | |
| *H04K 3/00* | (2006.01) | |
| *H04B 7/06* | (2006.01) | |
| *H01Q 1/24* | (2006.01) | |

(52) U.S. Cl.
CPC ........... *H01Q 3/2605* (2013.01); *H01Q 1/246* (2013.01); *H04B 7/0617* (2013.01); *H04K 3/90* (2013.01)

(58) Field of Classification Search
CPC .... H01Q 1/246; H01Q 3/2605; H04B 7/0617; H04K 3/90
USPC ........................................................ 342/378
See application file for complete search history.

(56) References Cited

FOREIGN PATENT DOCUMENTS

KR 20180066666 A * 6/2018

* cited by examiner

*Primary Examiner* — Leila Malek
(74) *Attorney, Agent, or Firm* — Stinson LLP

(57) ABSTRACT

The present disclosure provides an anti jamming system for a wireless communication system an antenna array comprising N antenna elements. At least two multiphase filters being connected to the antenna array and configured to receive an antenna element signal from each one of the N antenna elements. An anti-jamming system for a wireless communication system comprising an antenna array comprising N antenna elements and a filter configured to attenuate jamming signals from sources that is greater than, less than, or equal to N. An anti-jamming system for a wireless communication system comprising a multiphase filter connected to the antenna array to receive an antenna element signal from each antenna element of the antenna array, the multiphase filters comprising a first phase and a second phase, wherein the first phase of the multiphase filter executes a Frost's algorithm and the second phase of the multiphase filter executes a Maximin algorithm.

10 Claims, 12 Drawing Sheets
(8 of 12 Drawing Sheet(s) Filed in Color)

ANTI-JAMMING SYSTEM

CROSS-REFERENCE TO RELATED APPLICATIONS

This application claims priority to U.S. Provisional Patent Application Ser. No. 62/891,764, which is hereby incorporated by reference in its entirety.

STATEMENT REGARDING FEDERALLY SPONSORED RESEARCH

Aspects of this disclosure were made with government support under Grant No. FA9453-17-1-0020, awarded by Air Force Research Lab. The government of the United States has certain rights in what is disclosed. The invention described herein may be manufactured and used by or for the Government of the United States for all government purposes without the payment of any royalty.

FIELD

The present disclosure generally relates to anti jamming systems to improve GPS performance.

BACKGROUND

The global navigation satellite system (GNSS) receiver has made a large contribution in military, banking, security, telecommunications, and many other civilian applications such as autonomous driving car and an unmanned aerial vehicle drone. The global positioning system (GPS) is the most widely used satellite-based navigation system. GNSS signals are weak near the earth's surface and thereby are more prone to high-powered interference and jamming signals. GPS anti-jam technology relies on antennas that consist of N antenna elements and a processing unit that performs a phase-destructive sum of up to N−1 any intentional and unintentional interference signals in the GPS band. The performance of these technologies is limited to the number of individual antenna elements in the antenna array. For instance, if an antenna array contains N elements, then it is limited to attenuating interference signals coming from N−1 distinct directions of arrival. If this limitation is surpassed, then the GPS signal will rapidly degrade and become buried in the noise. In order to overcome these limitations, GPS anti jam technologies that do not rely on multi-element antennas are desired. The space-time adaptive processing (STAP) is an adaptive array processing algorithm that has been considered for both a GNSS receiver and a GPS receiver to suppress more than N−1 jamming signals, where N is the number of antenna elements.

BRIEF SUMMARY

In one embodiment, the present disclosure provides an anti-jamming system for a wireless communication system. The anti jamming system for a wireless communication system includes an antenna array comprising N antenna element. Two multiphase filters are connected to the antenna array and configured to receive an antenna element signal from each one of the N antenna elements. The multiphase filter array comprises a first phase and a second phase. The first phase of the multiphase filter executes a Frost's algorithm and the second phase of the multiphase filter executes a Maximin algorithm. The anti-jamming system for a wireless communication system is configured to attenuate jamming signals from a number of sources that is greater than, less than, or equal to N.

Other aspects and features will also be apparent hereinafter.

BRIEF DESCRIPTION OF DRAWINGS

The patent or application file contains at least one drawing executed in color. Copies of this patent or patent application publication with color drawing(s) will be provided by the Office upon request and payment of the necessary fee.

For a better understanding of the nature and objects of the disclosure, reference should be made to the following detailed description taken in conjunction with the accompanying drawings, in which.

Reference is made in the following detailed description of preferred embodiments to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim.

DETAILED DESCRIPTION

Figure 1:
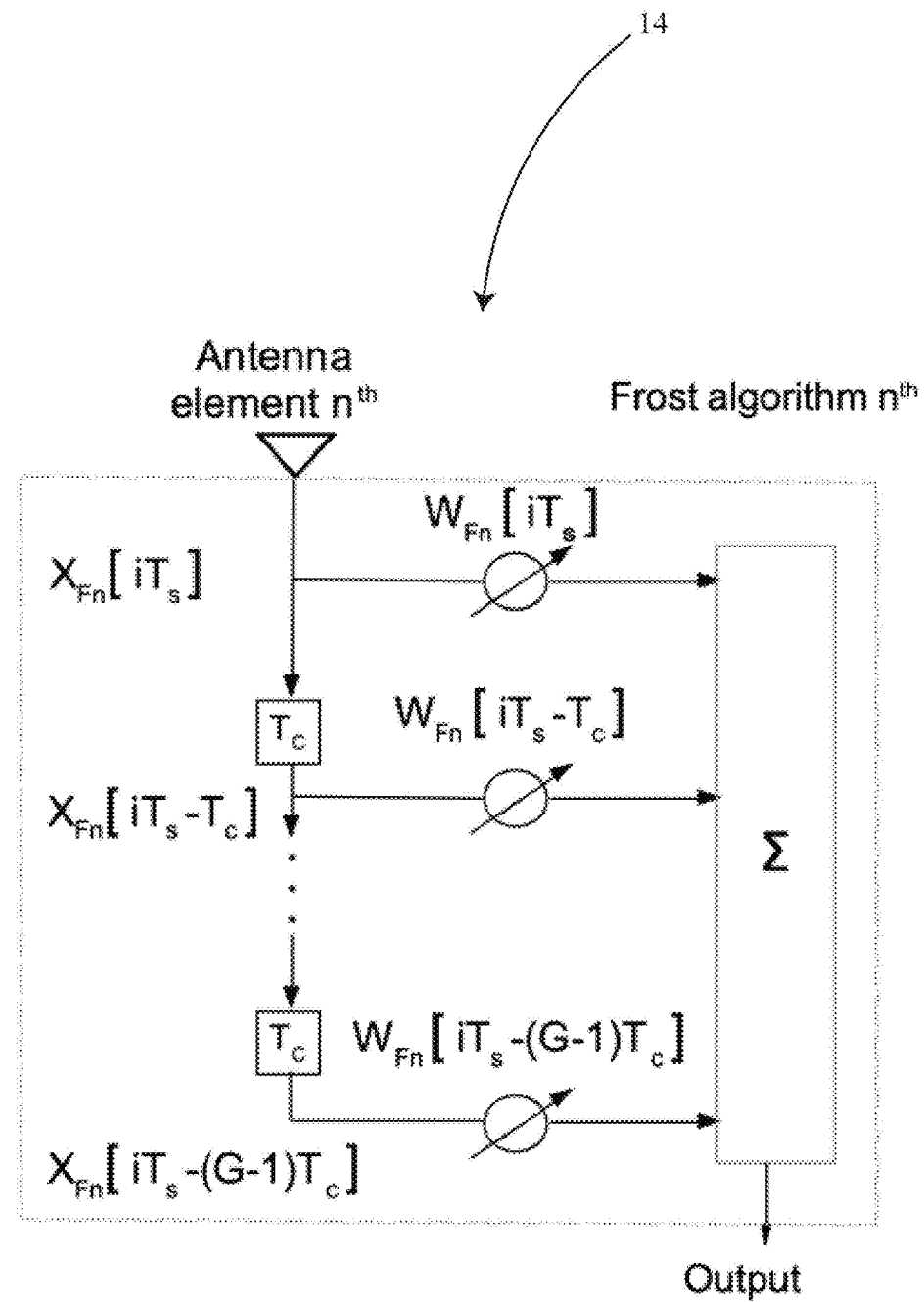
FIG. 1 is a diagram of a Frost algorithm at an n-th antenna.
Figure 2:
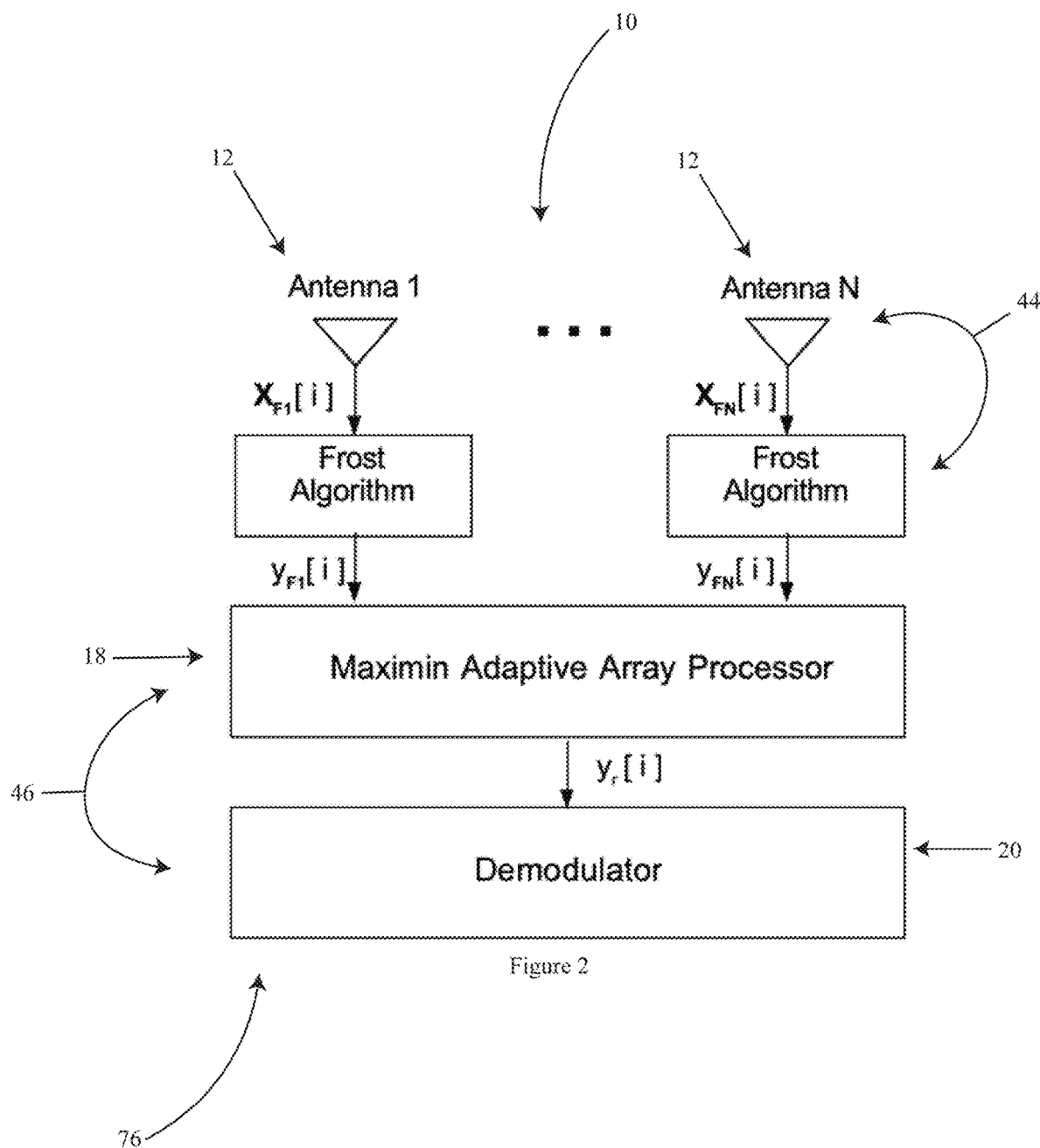
FIG. 2 is a diagram of an Enhanced Maximin algorithm.

Referring to FIGS. 1 and 2, the present disclosure provides a Global Positioning System (GPS) Anti-jamming system 10. The Anti-jamming system 10 provides a novel space-time adaptive processing (STAP) algorithm called the Enhanced Maximin 76 by combining a Frost algorithm and a Maximin algorithm. The GPS Anti-Jamming system 10 has N antennas 12, a Frost algorithm filter 14, a Maximin algorithm filter 16, a Maximin adaptive array processor 18, and a demodulator 20 as seen in FIG. 2.

The Frost algorithm filter 14 of GPS Anti-Jamming system 10 is a time-domain adaptive filter that can serve as an adaptive array algorithm. A model of the Frost algorithm filter 14 with N antennas 12 can be seen in FIG. 1. Each of the N antennas 12 is followed by the demodulator 20, a chip-match filter, and a chip-rate sampler. Let i and $T_s$ denote the symbol index and symbol-time interval, respectively. Then $T_s=GT_c$ where Tc is the chip-time interval, and one sample per chip is assumed. And let $x_F[i]=[x_{F1}[i], \ldots, x_{FN}[i]]^T$ denote the NG×1 (where G is the number of spreading sequence chips per symbol in the GPS signals) stack input vector, where $x_{Fn}[i]=[x_{Fn}[iT_s], \ldots, x_{Fn}[i-(G-1)T_{sc}]]^T$ represents the G×1 chip-sample input vector to the Frost algorithm filter 14 at the n-th antenna element with G chip samples per symbol. The weight vector, Equation 1 at the n-th antenna will be updated as:

$$w_{Fn}[i+1] = \left(I - \frac{1}{G}pp^T\right)[w_{Fn}[i] - 2\mu x_{Fn}[i]y_{Fn}^*[i]] + \frac{1}{G}p. \quad \text{Equation 1}$$

In equation 1, $$w_{Fn}[0] = \frac{1}{G}p,$$

and n=1, . . . , N. Here, p denotes a GPS spreading-sequence vector of G chips per symbol, i denotes a successive symbol index consisting of G chip match-filter outputs, and $Y_{Fn}[i]=(w_{Fn}[i])^H x_{Fn}[i]$ is the Frost algorithm filter 14 output.

Figure 12:
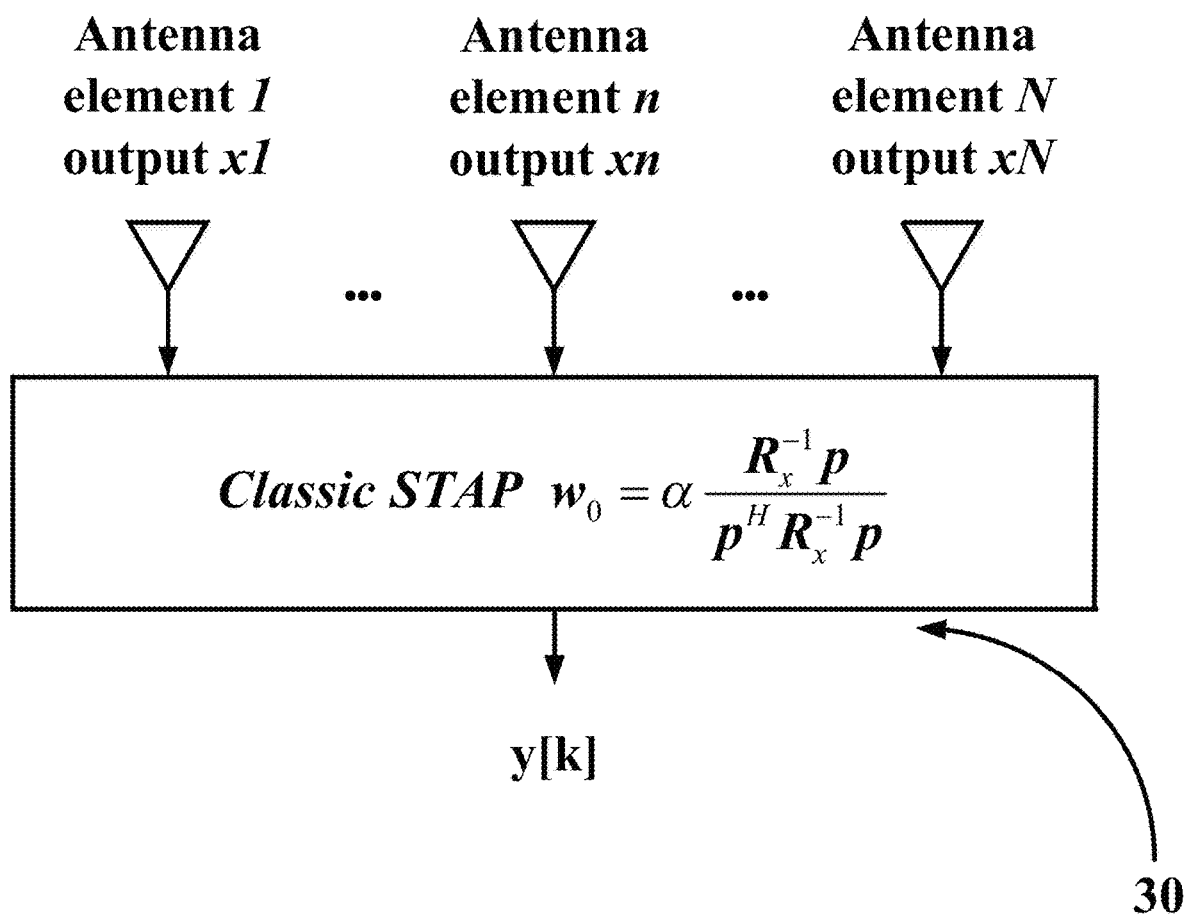
FIG. 12 is a schematic block diagram of a classic STAP algorithm.

The Frost algorithm filter 14 approximates the optimal weight while avoiding the matrix inversion but a classic approach in equation 2 below requires matrix inversions, and it is a stochastic-gradient descent algorithm so it approximates the autocorrelation matrix $R_x$ as $x_n[i]x_n^H[i]$. Computational errors occur if there is a violation of the constraint $(w_{Fn}[i])^H p \neq 1$, but the Frost algorithm filter 14 has the capability of correcting errors in the weight vector from preceding iterations, whereas, a classic STAP algorithm in FIG. 12, Equation 2, written as:

$$w_o = \alpha \frac{R_x^{-1}p}{p^H R_x^{-1}p} \quad \text{Equation 2}$$

has no error correcting capability. Moreover, the weight vector at the n-th antenna equation 1 requires a known and almost diagonal G×G matrix $(I-1/G\ pp^T)$ times a G×1 previously updated vector. Hence, the complexity of the Frost algorithm filter 14 is only order O(NG), which is significantly smaller than $O(N^3G^3)$ of the classic STAP algorithm 30 in FIG. 12 and equation 2.

The Maximin algorithm filter 16 is an adaptive-array algorithm that suppresses both wideband signals and narrowband signals. The Maximin algorithm filter 16 simultaneously maximizes the desired-signal component and minimizes the interference component in the despread signal.

The Maximin algorithm filter 16 provides a direct-sequence system with notable protection against tough interference, and the main aspects of the Maximin algorithm filter 16 are that it does not require directional angle information, training sequences, or sophisticated computations. When only the Maximin algorithm filter 16 is used, the received signals 36 are despread, filtered, and then applied to the Maximin filter. The input to the Maximin algorithm filter 16 is the symbol-rate vector, Equation 3, $x_{mm}[i]$ of size N×1:

$$x_{mm}[i]=s_{mm}[i]+n_{mm}[i] \quad \text{Equation 3}$$

where $s_{mm}[i]$ and $n_{mm}[i]$ are the discrete-time vectors of the desired sequence and the interference-plus-noise sequence, respectively. The index i denotes the despread symbols. The weight vector for the Maximin algorithm filter 16 $w_{mm}[k]$ is updated every m symbols, where k is the weight iteration index. The Maximin algorithm filter 16 weight vector, Equation 4, is updated as:

$$w_{mm}[k+1] = w_{mm}[k] + \alpha[k]\left[\frac{c_x[k]}{\hat{p}_x[k]} - \frac{c_n[k]}{\hat{p}_n[k]}\right], k \geq 1 \quad \text{Equation 4}$$

where $\alpha[k]$ is the adaptation sequence, $c_x[k]$ is the estimate of the correlation between $x_{mm}[i]$ and the output, $\hat{p}_x[k]$ is the estimate of the output power, $c_n[k]$ is the estimate of the interference-and-noise correlation vector, and $\hat{p}_n[k]$ is the estimate of the interference-and-noise output power. The symbol-rate output, Equation 5, is:

$$y_r(i)=\text{Re}[w^H(k)x(i)], i=km+1, \ldots, (k+1)m. \quad \text{Equation 5}$$

All STAP algorithms require code synchronization, which is synchronization with the spreading sequence of the desired signal. Code or spreading-sequence acquisition, which must be achieved before the STAP algorithm is activated, is obtained by using an algorithm that accommodates the interference enough that acquisition can be achieved. If strong interference is present, the standard acquisition system may have an excessive delay before acquisition, and other methods may be necessary. One method is to use the estimated direction-of-arrival of the desired signal followed by beamforming to enhance the desired signal. In another method, an adaptive-array algorithm exploits the high power of interference to reduce its level relative to that of the desired direct-sequence signal. After acquisition, the output of the STAP algorithm can be used to enable code tracking and demodulation.

The Enhanced Maximin algorithm 76, shown in FIG. 2, suppresses interference in both spatial and temporal dimensions by utilizing two phases. In a phase one 44, the received signal 36 is despread and processed by the Frost algorithm filter 14, and in a second phase 46, the Maximin algorithm filter 16 is active. The Frost algorithm filter 14 provides the symbol-rate input, Equation 6, of the Maximin algorithm filter 16:

$$x_{mm}[i]=y_F(i)=[y_{F1}[i], \ldots, y_{FN}[i]]^T \quad \text{Equation 6}$$

which is a stacked output from all N Frost algorithm filters 14. The Maximin algorithm filter 16 suppresses the interference remaining in the outputs of the Frost algorithm filter 14.

Let $(\theta, \phi)$ denote the azimuth and elevation angle of the desired signal or interference, respectively. The corresponding N×1 received steering vector $v_0$ at an antenna array 50 is represented, Equation 7, as:

$$v_0(\theta,\phi)=[\alpha_1 e^{j\Theta_1}, \ldots, \alpha_N e^{j\Theta_N}]^T \quad \text{Equation 7}$$

Here, $\alpha_n$ and $\Theta_n$ represents the relative amplitude and relative phase shift, respectively, at the n-th antenna element 12, n=1, . . . , N and:

$$\Theta_n = \frac{2\pi}{\lambda}[x_n\sin\theta\cos\phi + y_n\sin\theta\sin\phi + z_n\cos\theta] \quad \text{Equation 8}$$

where $\lambda$ is the wavelength, and $(x_n, y_n, z_n)$ is the n-th antenna element location.

In the Maximin algorithm filter 16, the adaptive filter generates m outputs every weight iteration k. Output of the Maximin algorithm filter 16 is fed into the demodulator 20 for the transmitted symbol decision and provides null beamforming patterns towards the narrowband interference signal or wideband interference signal directions, and directs the main beam toward the desired signal direction. The classic STAP algorithm 30 tries to suppress both narrowband interference signals and wideband interference signals simultaneously, but this proposed STAP algorithm, a combination of the Frost algorithm filter 14 and Maximin algorithm filter 16, will maximize the signal-to-interference-plus-noise ratio (SINR) of a desired signal 60 and minimize the interference signals. In addition, complexity of the proposed algorithm is only O(NG), which is significantly smaller than $O(N^3G^3)$ of the classic STAP algorithm 30.

The disclosure turns now to simulations of the proposed algorithm, which show the algorithm's effects. In all the simulations, we consider an array of N omnidirectional antennas 62. When N=5, the L-shaped array is on an xz plane at locations (2d; 0; 0), (d; 0; 0), (0; 0; 0), (0; 0; d), and (0; 0; 2d). All incoming signals are assumed to arrive as plane waves, and each interference source is in the plane of the antenna array 50. The desired direct-sequence signal uses binary phase-shift keying and arrives at the array antenna 50 with the DOA equal to $(\phi, \theta)=(0, \pi/6)$. The noise is modeled as bandlimited, Gaussian noise, and the signal-to-noise ratio (SNR) is set to 10 dB in each antenna branch. Each interference signal has the same carrier frequency as the desired signal and its signal-to-interference ratio (SIR) is set to 0 dB.

The desired signal 60 is spread by a Gold sequence p(i) with length G=127 for the purpose of illustration. For weight updating in the Frost algorithm, the required initial weight vector equation 1 is selected as w(0)=p/G, and the convergence control parameter μ is set to a small positive constant value of 0:001. The initial weight of the Maximin algorithm is set to w(0)=[1, 0, 0, 0, 0]T, and the adaptation constant is set to α=1. Every weight is updated after m=10 data symbols. To determine the SINR at each weight iteration, the SINR at the processor output is measured every sample time, and then the average over all samples in the time interval between the current weight iteration and the previous weight iteration is calculated. Wideband interference signals have the same carrier frequency as the desired signal carrier frequency (i.e., the carrier frequency difference Δf=0) and are spread with the same spreading sequence as the desired signal, but arrive with different chip delays, and different random data. The different chip delays can reflect repeater or follower interference signals. The tone interference signals are sine waves with the same carrier frequency as the desired signal 60 but with different phase shifts.

Figure 3:
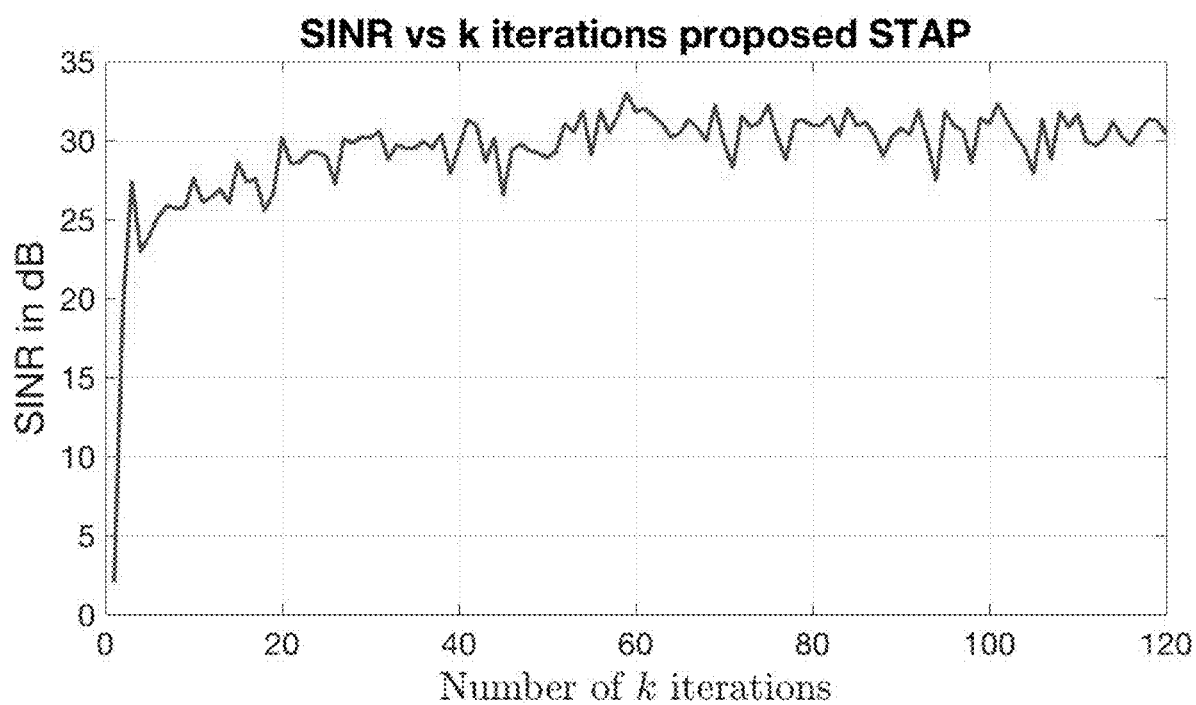
FIG. 3 a line graph of signal-to-interference-plus-noise ratio (SINR) versus iterations of the Enhanced Maximin algorithm.

In FIG. 3, M=6 interference signals and N=5 antenna elements 12 are assumed for an initial simulation to illustrate the algorithm convergence and test the hypothesis that the Enhanced Maximin algorithm 76 can suppress the number of interference signals more than the number of antennas 12. Four wideband interference signals and two-tone interference signals are considered all with the same carrier frequency as the desired signal (i.e., Δf=0). The azimuth angles of the interference signals are linearly separated by π/M=π/6 from the desired azimuth angle and from each other, but the elevation angle of the interference signals are fixed at −π=6, that is, $(\phi, \theta)$=(−3 π/6, =6), (−2 π/6, −π/6), (−π/6,−π/6), (π/6; −π/6), (2 π/6; −π/6), and (3 π/6; −π/6). FIG. 3 illustrates the SINR variation versus weight iterations of the Enhanced Maximin algorithm 76 for an L-shaped array on the xz plane. Observe in FIG. 3 that the SINR of the Enhanced Maximin algorithm 76 approaches steady state after 50 iterations. The average SINR after steady state is 28.3 dB. Let v $(\phi, \theta)$ denote the steering vector, which is the array response to an ideal plane wave arriving at angle $(\phi, \theta)$. The array gain pattern, Equation 8, using a steady-state weight vector via for the given signal and interference environment is $$G(\phi, \theta, k) = \frac{|w^H[k]v(\phi, \theta)|^2}{\|w[k]\|^2} \quad \text{Equation 8}$$

where $\phi$ and $\theta$ are running variables from −π to π and −π/2 to −π/2, respectively.

Figure 4:
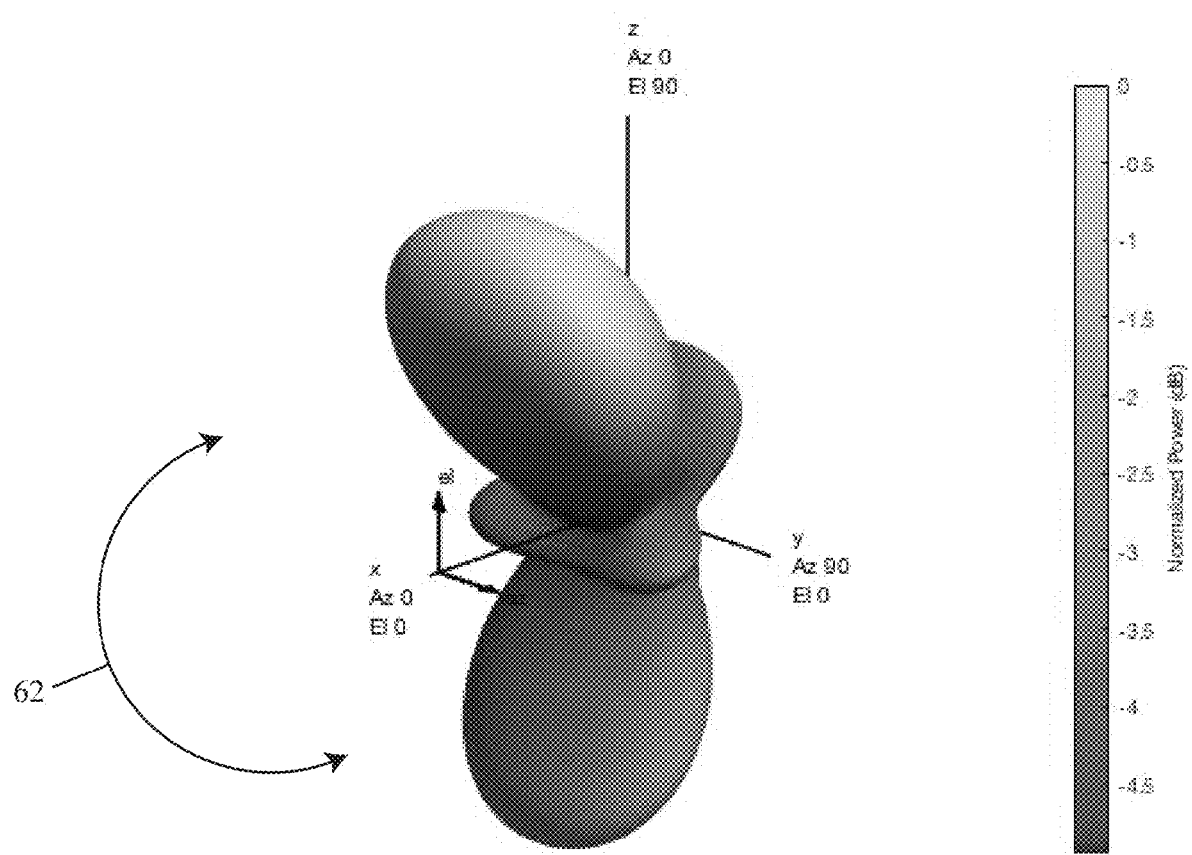
FIG. 4 is an illustration of antenna array gain of linear L-shaped.

FIG. 4 presents a three-dimensional polar-coordinate antenna-array gain of an L-shaped array on the xz plane using equation (8). Observe that the beamforming direction in FIG. 4 is focusing to the desired signal's DOA $(\phi, \theta)$=(0, π/6), whereas it is low toward all six interference signals.

Figure 5:
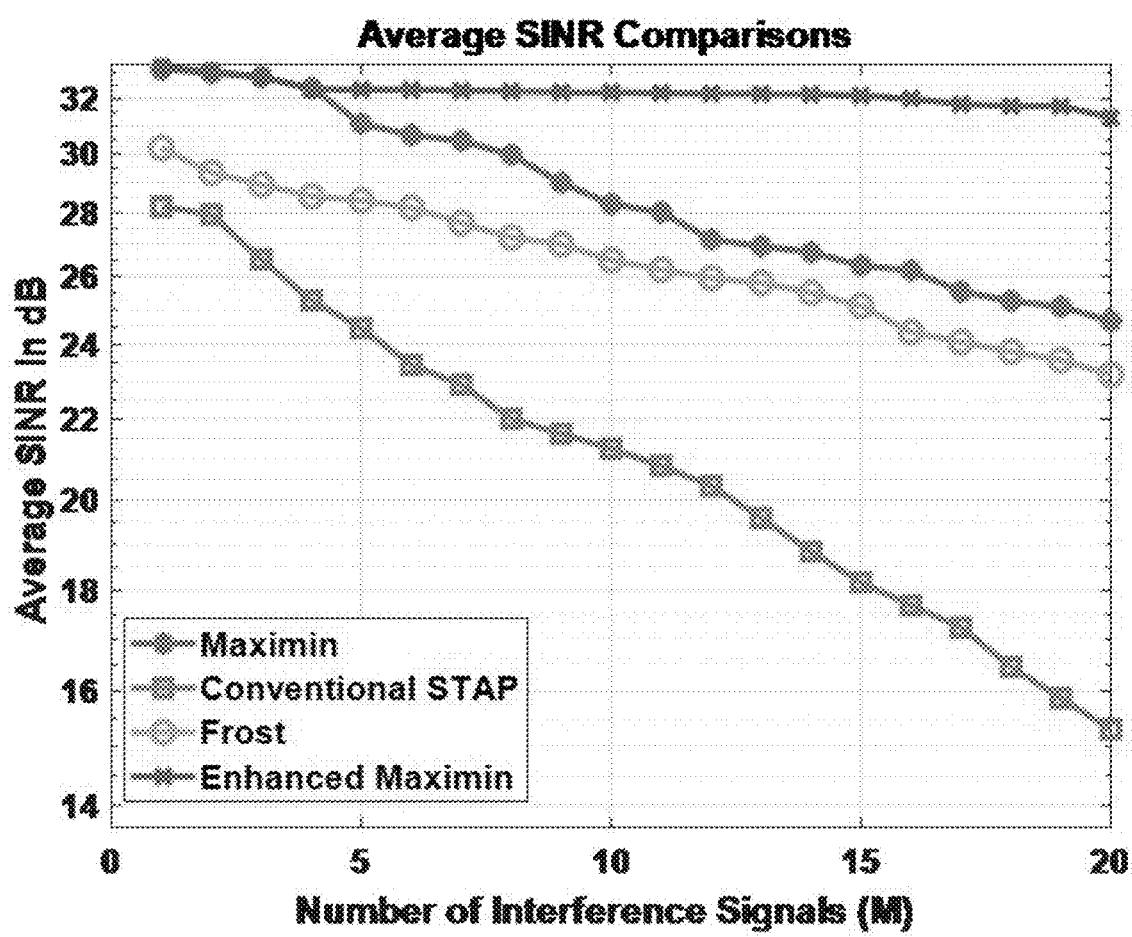
FIG. 5 is a line graph of average SINR comparisons under additive white Gaussian noise (AWGN) with M interference signals.

In FIG. 5, the simulation results show a comparison of the average SINR for the Enhanced Maximin algorithm 76, the Maximin algorithm filter 16, Frost algorithm filter 14, and the classical STAP algorithms 30 over M interference signals with N=5 antenna elements. The autocorrelation matrix $R_x$, in equation 2 for the conventional STAP is estimated once with a sufficiently long period of data, e.g., 1,000 bit intervals. Twenty trials are calculated for each M interference signals in which tone and wideband interference signals have an equal occurrence. The azimuth angles of the interference signals are linearly separated by π/M from the desired azimuth angle and from each other, but the elevation angles of the interference signals are fixed at −π/6. The wideband and tone interference signals have different DoAs.

Observe in FIG. 5 that the classic STAP algorithm 30 has the worst performance among the four algorithms, and its average SINR is below 24 dB when the number of interference signals M is greater than the number of antennas N. The Enhanced Maximin algorithm 76 has the best performance, the Maximin algorithm filter 16 the second best, and the Frost algorithm filter 14 the third best.

Figure 6:
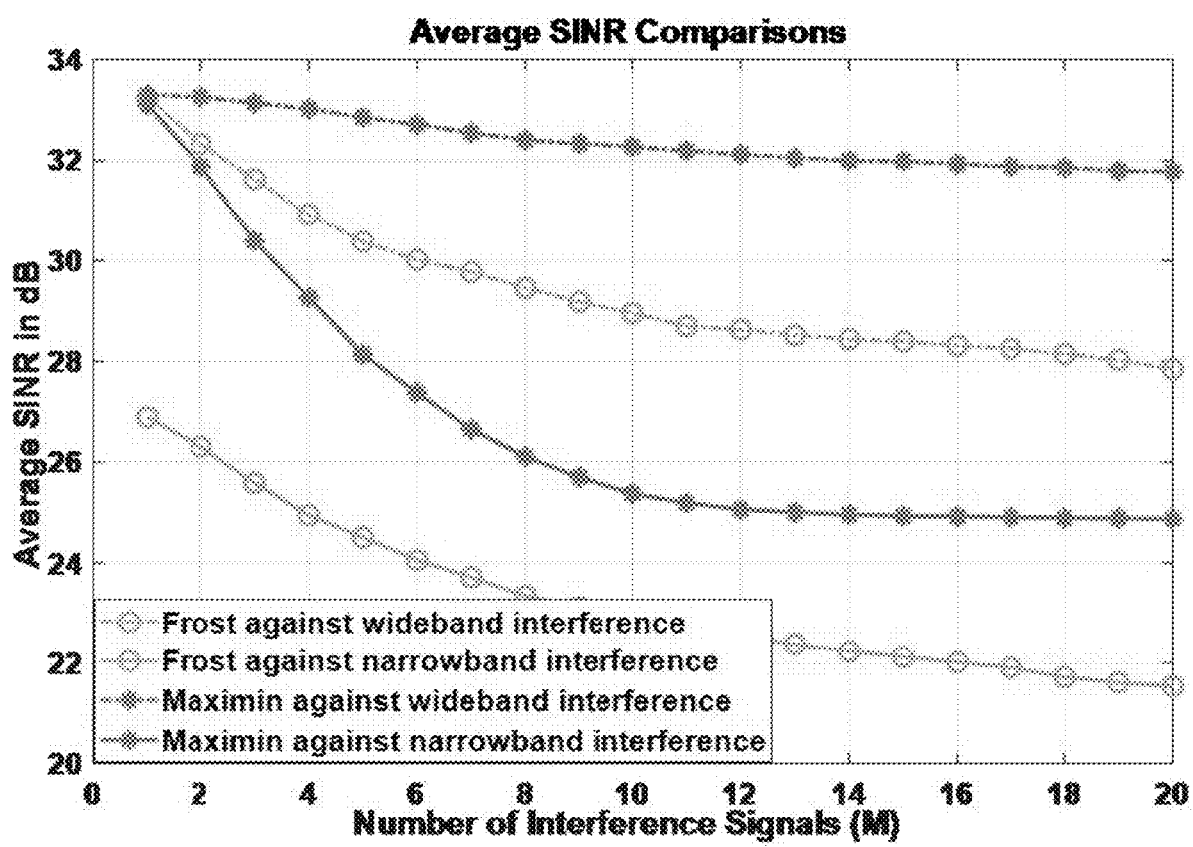
FIG. 6 is a line graph of the Frost algorithm and the Maximin algorithm against wideband and narrowband interference.

To clarify the roles of the Frost and Maximin parts in the proposed algorithm, FIG. 6 presents the performance of the Frost algorithm filter 14 and the Maximin algorithm filter 16 against wideband interference signals alone and narrowband interference signals alone. Observe that both the Frost algorithm filter 14 and the Maximin algorithm filter 16 perform better against wideband-only interference signals 58 than the tone-only environment. Also observe that the Maximin algorithm filter 16 performs always better than the Frost algorithm filter 14. This is because the Frost algorithm filter 14 is constrained to point the main beam of the adaptive array in the direction of the desired signal, whereas the Maximin algorithm filter 16 is free to maximize the SINR with no constraints on the beam pattern. The primary role of the Frost algorithm filter 14 within the proposed algorithm is to boost the relatively weak performance of Maximin algorithm filter 16 against tones. The Frost algorithm filter 14 does the despreading, albeit imperfectly, prior to Maximin algorithm filter 16, and hence Maximin algorithm filter can work directly at the symbol rate without the burden of processing chip-rate samples.

Twenty trials for each of N antennas are calculated. The number of interference signals is fixed to M=10 in which narrowband interference signals and wideband interference signals have an equal occurrence. The other parameters used to obtain results in FIG. 7 are the same as used to obtain the results shown later in FIGS. 9 and 10.

Figure 7:
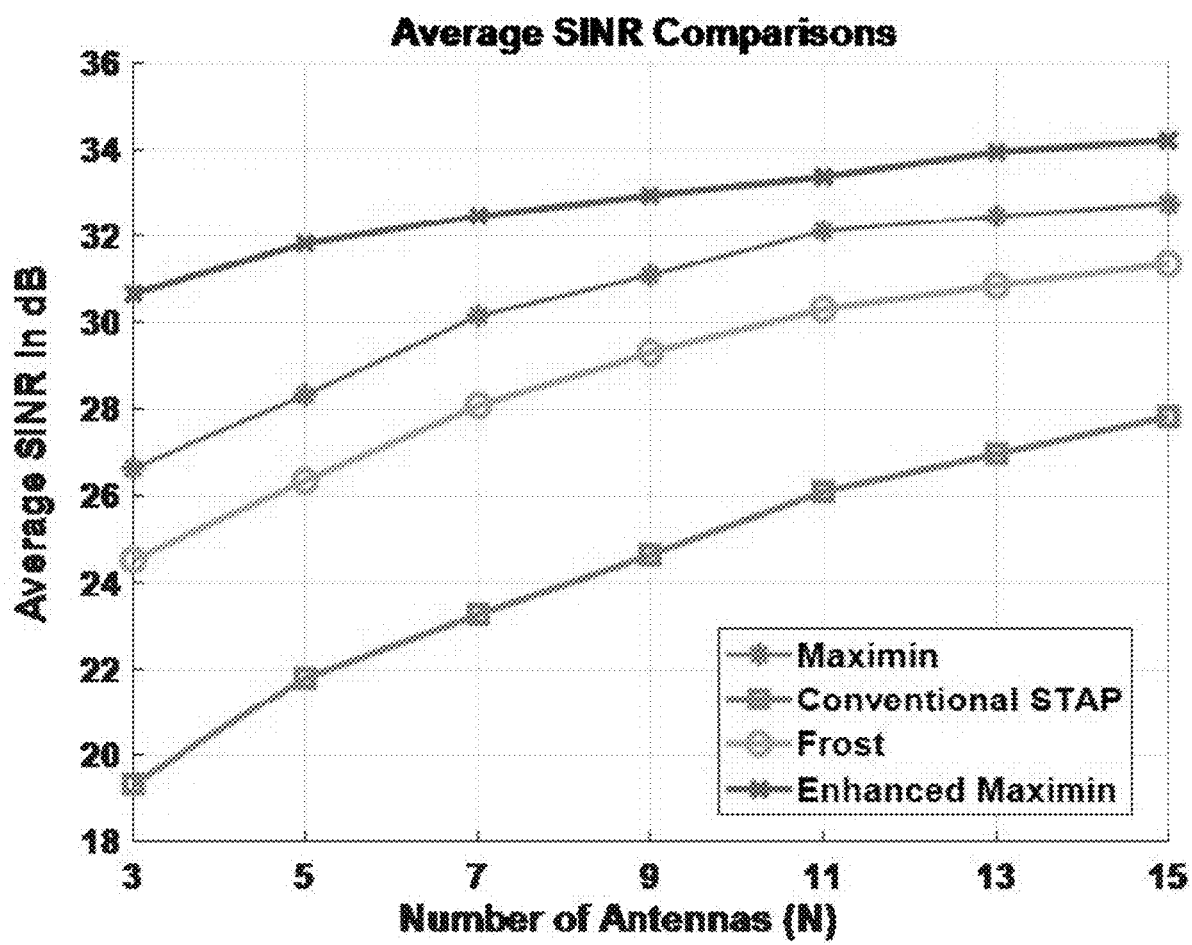
FIG. 7 is a line graph of average SINR comparisons of the classic STAP, Maximin, Frost, and Enhanced Maximin algorithms under AGWN using N antennas with interference signals.

FIG. 7 shows comparisons of the average SINR among the Enhanced Maximin algorithm 76, Frost algorithm filter 14, Maximin algorithm 16, and classic STAP algorithms 30 under the AWGN channel as the number of antenna elements N increases for M=10 fixed number of interference signals. There are five tones and five wideband signals. The average SINR of the classic STAP algorithm 30 is low. Observe in FIG. 7 that the Enhanced Maximin algorithm 76 has the best performance among the other algorithms even when N<M. The Enhanced Maximin algorithm 76, Maximin algorithm filter 16, and Frost algorithm filter 14 systems are not only less complex but use fewer antennas N equal to 3, 5, and 7, respectively to achieve the average SINR=27 dB. Therefore, fewer radio frequency (RF) chains including mixers and bandpass filters achieve the same performance, with a significant reduction in size, weight, power and no degradation, compared with the classic STAP algorithm 30 in equation 2, which requires 15 antenna elements.

Figure 8:
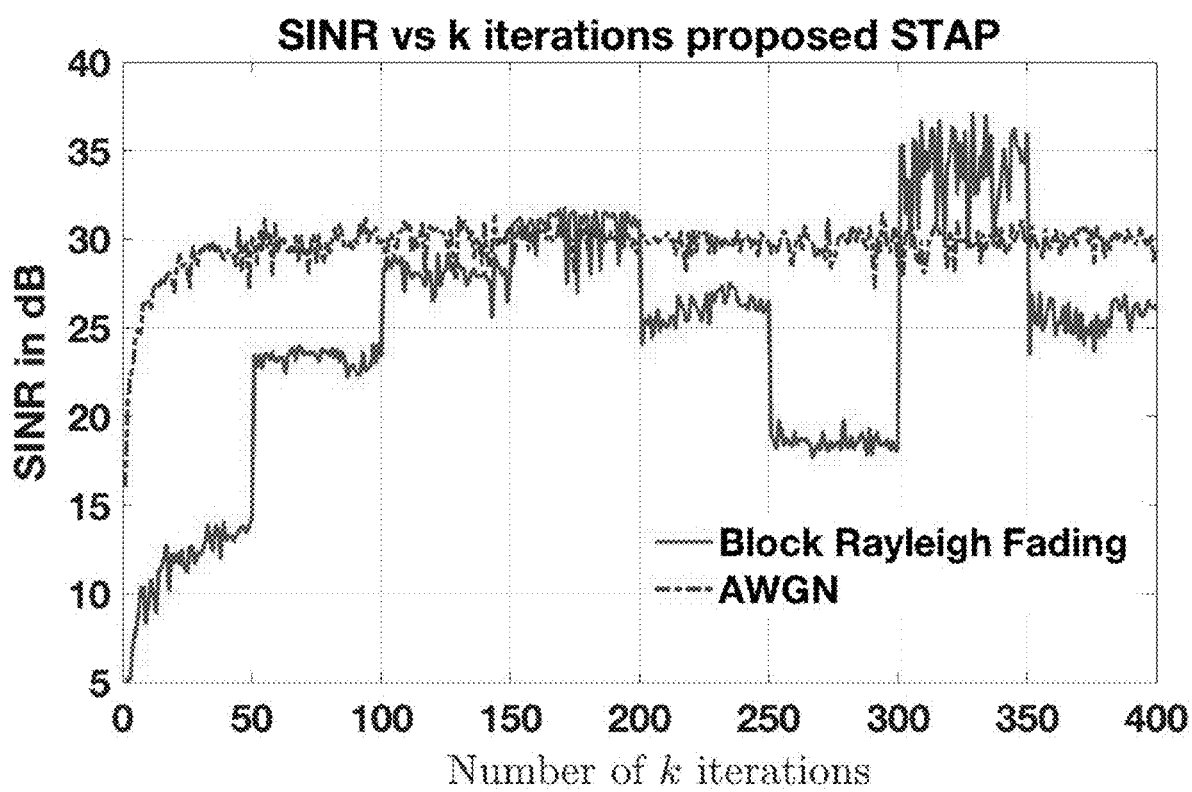
FIG. 8 is a line graph of SINR under block Rayleigh fading and AWGN channel in presence of interference.

A block Rayleigh fading channel in addition to AWGN is considered. A line of sight (LOS) is typically available, and a Rician fading channel has usually been assumed for a satellite channel model. Furthermore, a GPS receiver can often be placed in a terrestrial Rayleigh fading environment. The Rayleigh-fading channel coefficient h is assumed to remain constant for a single block of $T_q$ consecutive symbols and then change to an independent realization in the next block, where $T_q$ symbols span the channel coherence time over which the channel stays constant. The message of length L is spread by a spreading sequence of length G and is transmitted using binary phase shift keying (BPSK) modulation. The spread transmit codeword s of length LG=B $T_q$ spans B independent channel realizations. The complex block fading coefficient vector is written as h=[$h_1$, ..., $h_B$]$^T$, where $h_b$=($h_{bc}$+j$h_{bs}$). The $h_{bc}$ and $h_{bs}$ represent in-phase and quadrature-phase Gaussian random variables, that are both distributed with a mean of zero and variance $\sigma^2/2$ equal to ½. The probability density function, Equation 10, of the instantaneous received symbol SNR in a Rayleigh fading channel is written as $$f_R(r) = \frac{r}{\sigma^2} \exp\left(-\frac{r^2}{2\sigma^2}\right) u(r) \qquad \text{Equation 10}$$

where r=|$h_b$|, and u(r) is a step function. The received signal during a fading block, Equation 11, is $$x_{rcv} = hs + n \qquad \text{Equation 11}$$

where s is the spread transmit desired signal, and n refers to the noise-plus-spread interference signals. After obtaining samples from the received signal, they are combined using the well-known maximum ratio combining (MRC) method Equation 12:

$$x_{MRC} = h^* x_{rcv} = |h|^2 s + h^* n \qquad \text{Equation 12}$$

where |h| is the Rayleigh fading coefficient magnitude with average power E[|$h^2$|]=$\sigma^2$=1, and $x_{MRC}$ is the obtained signal for $T_q$ period. Assume that the channel state information (CSI) is available at the receiver (but not at the transmitter). FIG. 8 illustrates the SINR variation versus weight iterations of the Enhanced Maximin algorithm 76 for an L-shaped linear array pattern on the xz plane. We consider M=6 interference signals, of which 4 are wideband and 2 are narrowband interferences, which are modeled as sine waves whose frequency is 1 Hz different from the desired signal carrier frequency (i.e., Δf=1 Hz). Observe in FIG. 8 that both the SINR under fading and AWGN approaches steady state after 50 iterations. In the fading case, there is a transition period only in the first 50 iterations. Then, after the weight is optimum in the first block, the SINRs in the following fading blocks reach optimum steady state values almost immediately within a few iterations, and they are proportional to the square of the fading channel coefficient magnitudes. This is because the optimum weight vector obtained in the current fading block is employed as the initial weight vector for the next fading block. The average SINRs under AWGN and block Rayleigh fading after steady state are 28.3 and 24.2 dB, respectively.

Figure 9:
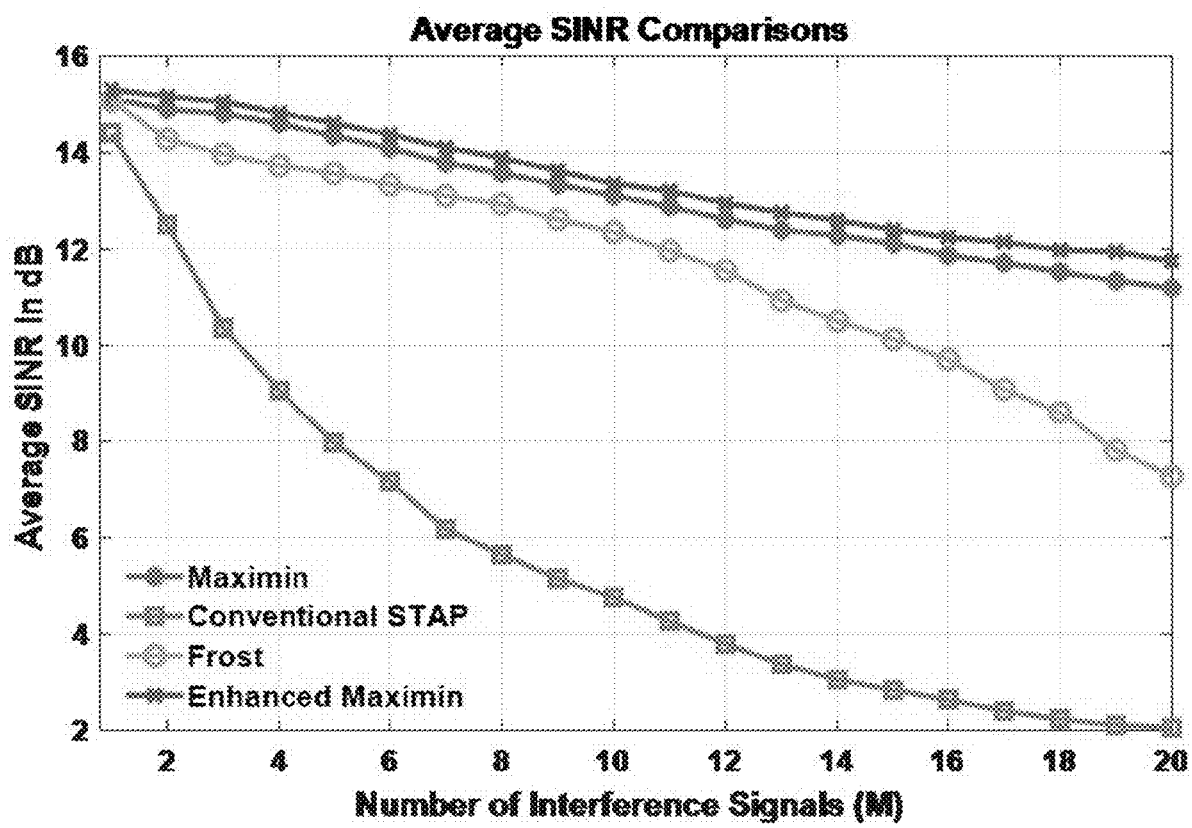
FIG. 9 is a line graph of average SINR comparison of the classic STAP, Maximin, Frost, and Enhanced Maximin algorithms under Rayleigh fading channel in the presence of M interference signals.

FIG. 9 shows a comparison of the average SINR among the Enhanced Maximin algorithm 76, Frost algorithm filter 14, Maximin algorithm filter 16, and conventional STAP algorithms as the number of interference signals M increases under Rayleigh block fading. Twenty trials are simulated for each M interference signals. The parameters used to obtain the results shown in FIG. 9 are the same as those used to obtain the results shown in FIG. 5.

For Rayleigh block fading simulation, B=5,000 number of distinct Rayleigh fading coefficients with distinct amplitude $h_b$ were generated for a given set of parameters SIR=0 dB and SNR=10 dB, b=1, ..., B. Each simulated fading coefficient h was multiplied to $T_q$=100 symbols which represents a fading block in Equation 13. Then, each algorithm was run, and the average of each algorithm SINR output over each block of 100 symbols was obtained and denoted by SINR(R=|$h_b$|). Then the probability density function Pr[R=|$h_b$|] in Equation 13 was multiplied to find the overall average $E_R$ [SINR(R)] with respect to fading block amplitude random variable R. The average SINR, Equation 13, in FIG. 9 represents $$E_R[SINR(R)] = \sum_{b=1}^{B} SINR(R = |h_b|) Pr[R = |h_b|] \qquad \text{Equation 13}$$

Observe in FIG. 9 that the Enhanced Maximin algorithm performs the best, while the classic STAP algorithm 30 still has the worst performance among others under block Rayleigh fading. If we target the SINR at 12 dB, then the Enhanced Maximin algorithm 76, Maximin algorithm filter 16, and the Frost algorithm filter 14 can suppress 11, 13, and 19 interferences signals, respectively. The classic STAP algorithm 30 can suppress only 2 interferences.

Figure 10:
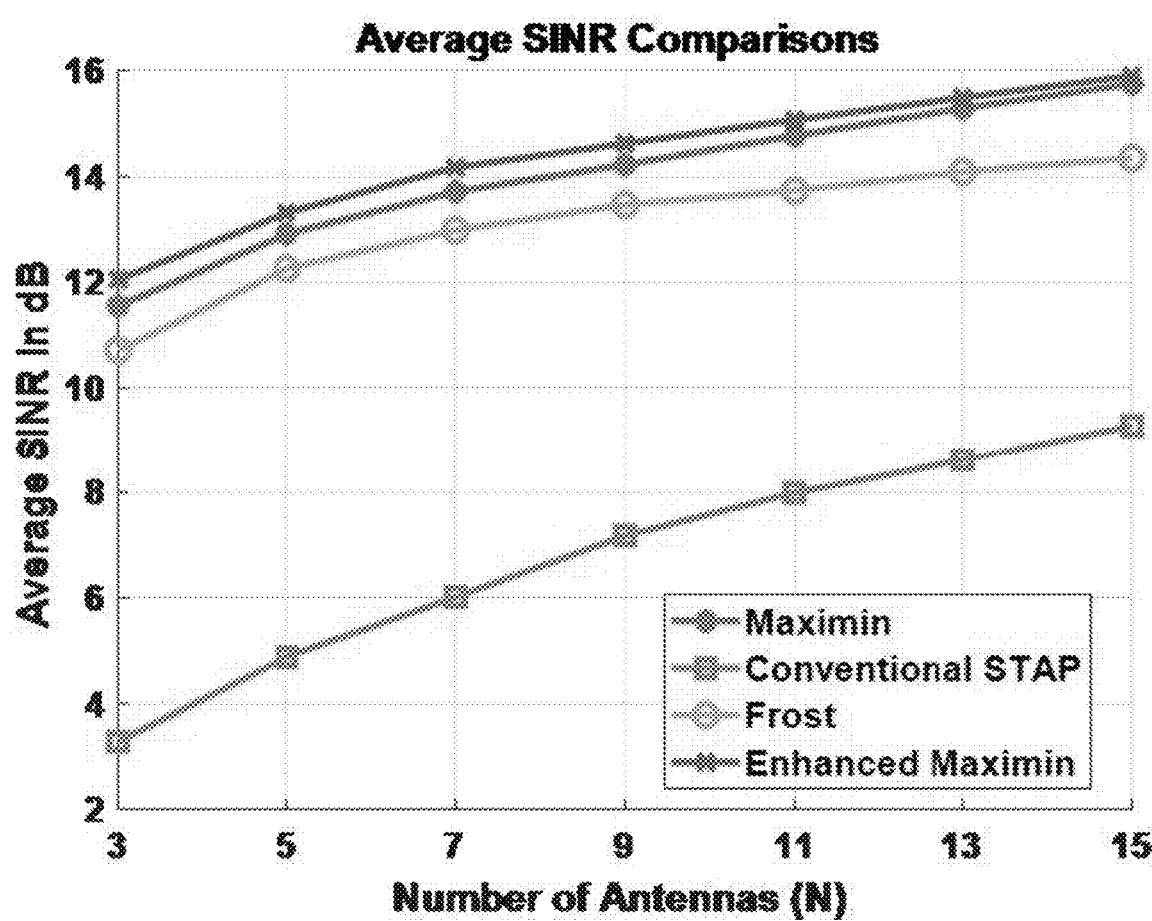
FIG. 10 is a line graph of average SINR comparison of the classic STAP, Maximin, Frost, and Enhanced Maximin algorithms under Rayleigh block fading using N antennas in the presence of M interferences signals with equal number of tones and wideband interferences.
Figure 11:
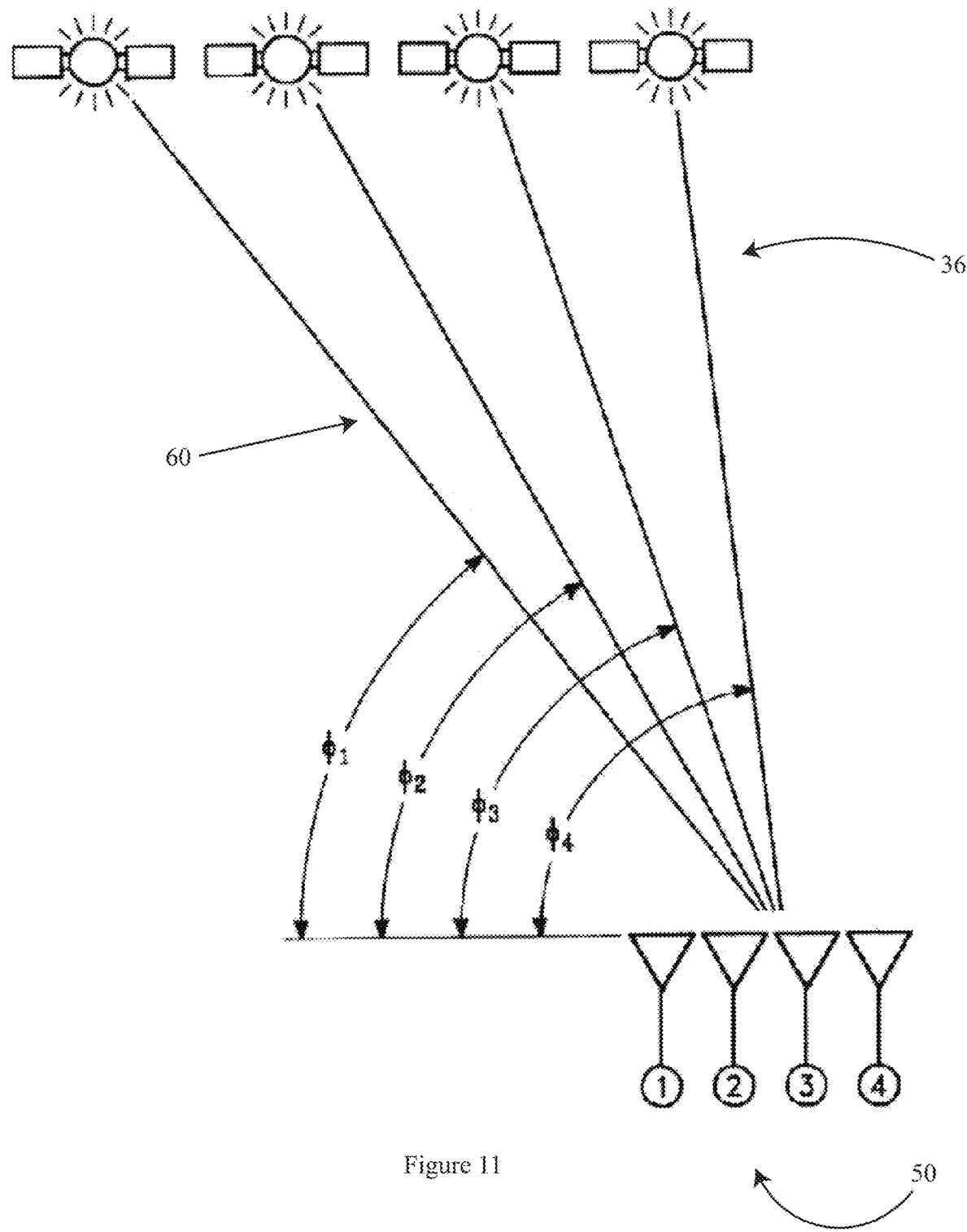
FIG. 11 is a schematic illustration of antennas receiving signals and their respective azimuth angles.

FIG. 10 shows comparisons of the average SINR among the Enhanced Maximin algorithm 76, Frost algorithm filter 14, Maximin algorithm filter 16, and classic STAP algorithms 30 as the number of N antenna elements 12 increases under Rayleigh block fading with M=10 interference signals. There are five tones and five wideband signals. The results in FIG. 10 under Rayleigh block fading are corresponding to those in FIG. 7 under AWGN. Again, the average SINR of the classic STAP algorithm 30 is low. Observe in FIG. 10 that the Enhanced Maximin algorithm 76 has the best performance again among the algorithms. The Enhanced Maximin algorithm 76, Maximin algorithm filter 16, and Frost algorithm filter 14 can reach 12 dB in SINR with only N=3, 4, and 5 antenna elements 12, respectively, even when M=10 interferences are present. The classic STAP algorithm 30 cannot achieve the SINR equal to 12 dB even with N=15 antenna elements 12.

The combination Enhanced Maximin algorithm 76 enhances the performance of the STAP algorithm, even in cases where the number of interference signals are more than the number of antenna elements 12. Comparing the average SINR performance of the Enhanced Maximin algorithm 76, Frost algorithm filter 14, and Maximin algorithm filter 16 to the classic STAP algorithm 30 under AWGN and block Rayleigh fading the SINR obtained with the Enhanced Maximin algorithm shows the best results. This algorithm has complexity $O(NG)$, whereas the classic STAP algorithm's 30 complexity is $O(N^3G^3)$. Because the Enhanced Maximin algorithm 76 uses a stochastic gradient algorithm, it shows better performance than the classic STAP algorithm 30 in a nonstationary time-varying environment. Moreover, the Enhanced Maximin algorithm 76 can achieve the same performance with fewer antennas than the classic STAP algorithm 30. Therefore, the number of radio-frequency chains can be reduced significantly with the Enhanced Maximin algorithm 76. It can be concluded that the low complexity and small number of antennas used the Enhanced Maximin algorithm 76 makes a significant reduction in system size, weight, and power needed to operate with no degradation.

The foregoing description has been presented for the purposes of illustration and description. It is not intended to be exhaustive or to limit the disclosure to the precise form disclosed. Many modifications and variations are possible in view of this disclosure. Indeed, while certain features of this disclosure have been shown, described and/or claimed, it is not intended to be limited to the details above, since it will be understood that various omissions, modifications, substitutions and changes in the apparatuses, forms, method, steps and system illustrated and in its operation can be made by those skilled in the art without departing in any way from the spirit of the present disclosure.

Furthermore, the foregoing description, for purposes of explanation, used specific nomenclature to provide a thorough understanding of the disclosure. However, it will be apparent to one skilled in the art that the specific details are not required in order to practice the disclosure. Thus, the foregoing descriptions of specific embodiments of the present disclosure are presented for purposes of illustration and description. They are not intended to be exhaustive or to limit the disclosure to the precise forms disclosed, many modifications and variations are possible in view of the above teachings. The embodiments were chosen and described in order to best explain the principles of the disclosure and its practical applications, to thereby enable others skilled in the art to best utilize the disclosed system and method, and various embodiments with various modifications as are suited to the particular use contemplated.

What is claimed is:

1. An anti jamming system for a wireless communication system, the anti jamming system comprising:
   an antenna array comprising N antenna elements, wherein N is a non-zero positive integer; and
   a multiphase filter system comprising N first phase filter elements and a second phase filter element, each first phase filter element configured to receive an antenna element signal from a respective one of the antenna elements and provide a filter output, the second phase filter element configured to receive the filter outputs from the first phase filter elements;
   wherein each first phase filter element executes a Frost's algorithm with a full period of a PN spread spectrum chip sequence.

2. The anti jamming system as set forth in claim 1, wherein the anti jamming system is configured to attenuate jamming signals from a number of sources greater than N.

3. An anti jamming system for a wireless communication system, the anti jamming system comprising:
   an antenna array comprising N antenna elements, wherein N is a non-zero positive integer; and
   a multiphase filter system comprising N first phase filter elements and a second phase filter element, each first phase filter element configured to receive an antenna element signal from a respective one of the antenna elements and provide a filter output, the second phase filter element configured to receive the filter outputs from the first phase filter elements;
   wherein the second phase filter element executes a maximin algorithm.

4. The anti jamming system as set forth in claim 3, wherein the anti jamming system is configured to attenuate jamming signals from a number of sources greater than N.

5. An anti jamming system for a wireless communication system, the anti jamming system comprising:
   an antenna array comprising N antenna elements, wherein N is a non-zero positive integer;
   a multiphase filter system comprising N first phase filter elements and a second phase filter element, each first phase filter element configured to receive an antenna element signal from a respective one of the antenna elements and provide a first phase filter output, the second phase filter element configured to receive the first phase filter outputs from the first phase filter elements and provide a second phase filter output; and
   a demodulator configured to receive the second phase filter output from the second phase filter element and provide at least one null beamforming pattern toward a narrowband or wideband jamming signal and/or provide a maximum beamforming pattern toward a desired signal direction.

6. The anti jamming system as set forth in claim 5, wherein the anti jamming system is configured to attenuate jamming signals from a number of sources greater than N.

7. An anti jamming system for a wireless communication system comprising a multiphase filter connected to an antenna array to receive an antenna element signal from each antenna element of the antenna array, the multiphase filter comprising a first phase and a second phase, wherein the first phase of the multiphase filter executes a Frost's algorithm and the second phase of the multiphase filter executes a maximin algorithm.

8. The anti jamming system as set forth in claim 7, wherein the first phase of the multiphase filter executes the Frost's algorithm with a full period of PN spread spectrum chip sequence.

9. The anti jamming system as set forth in claim 7, wherein the wireless communication system is GPS.

10. The anti jamming system as set forth in claim 7, further comprising a demodulator configured to receive an output signal of the multiphase filter and provide at least one null beamforming pattern toward a narrowband or wideband jamming signal and/or provide a maximum beamforming pattern toward a desired signal direction.

\* \* \* \* \*